US009786460B2

(12) United States Patent
Simonin

(10) Patent No.: US 9,786,460 B2
(45) Date of Patent: Oct. 10, 2017

(54) GROUND FAULT CIRCUIT INTERRUPTER (GFCI) SYSTEM AND METHOD

(71) Applicant: Hubbell Incorporated, Shelton, CT (US)

(72) Inventor: Stephen Paul Simonin, Northfield, CT (US)

(73) Assignee: Hubbell Incorporated, Shelton, CT (US)

( * ) Notice: Subject to any disclaimer, the term of this patent is extended or adjusted under 35 U.S.C. 154(b) by 472 days.

(21) Appl. No.: 14/577,048

(22) Filed: Dec. 19, 2014

(65) Prior Publication Data

US 2016/0181047 A1 Jun. 23, 2016

(51) Int. Cl.

| | |
|---|---|
| ***H02H 3/00*** | (2006.01) |
| ***H01H 71/12*** | (2006.01) |
| ***H01R 24/30*** | (2011.01) |
| ***H01R 25/00*** | (2006.01) |
| ***H01R 13/713*** | (2006.01) |
| ***H01R 24/78*** | (2011.01) |
| *H01R 107/00* | (2006.01) |

(52) U.S. Cl.

CPC ......... *H01H 71/12* (2013.01); *H01R 13/7135* (2013.01); *H01R 24/30* (2013.01); *H01R 24/78* (2013.01); *H01R 25/006* (2013.01); *H01R 2107/00* (2013.01)

(58) Field of Classification Search

CPC ...................................................... H01H 71/12

USPC ............................................................ 361/42

See application file for complete search history.

(56) References Cited

U.S. PATENT DOCUMENTS 4,230,919 A * 10/1980 Schantz ................. H01H 3/161 200/244
5,341,191 A 8/1994 Crookston et al.
6,118,090 A * 9/2000 Osvatic .................. H01H 3/166 200/61.76
7,336,457 B2 * 2/2008 Liscinsky, III ........ H02H 3/044 361/115
7,442,894 B2 * 10/2008 Villain ................... H01H 13/48 200/341
8,033,838 B2 10/2011 Eldridge et al.
8,853,582 B2 10/2014 Tengler et al.
2006/0186090 A1 8/2006 Kang et al.

(Continued)

OTHER PUBLICATIONS

PCTUS2015/66633 International Search Report and Written Opinion dated Mar. 3, 2016.

*Primary Examiner* — Stephen W Jackson
(74) *Attorney, Agent, or Firm* — Michael Best & Friedrich, LLP

(57) ABSTRACT

A wiring device including a face contact; one or more line contact arms; one or more load contact arms; and a fault detection circuit. The one or more line contact arms having an upper line contact located on a bent portion of the line contact arm, and a lower line contact located on a substantially straight portion of the line contact arm. The one or more load contact arms having a load contact located on a bent portion of the load contact arm. The fault detection circuit that detects a fault condition in said wiring device and generates a fault detection signal when said fault condition is detected, wherein said fault detection signal electrically disconnects the face contact from the upper line contact and the lower line contact from the load contact.

18 Claims, 9 Drawing Sheets

(56) References Cited

U.S. PATENT DOCUMENTS

| | | | |
|---|---|---|---|
| 2006/0279883 | A1 | 12/2006 | Elms et al. |
| 2008/0078667 | A1 | 4/2008 | Jin et al. |

* cited by examiner

GROUND FAULT CIRCUIT INTERRUPTER (GFCI) SYSTEM AND METHOD

BACKGROUND

The present invention relates generally to switched electrical devices. More particularly, the present invention is directed to circuit interrupting devices, such as ground fault circuit interrupter (GFCI) devices, that switch to a "tripped" or unlatched state from a "reset" or latched state when one or more conditions is detected. Such devices consistent with embodiments of the invention disclosed herein are more reliable and have a longer life expectancy than previously known GFCI devices.

GFCI devices having contacts that are biased toward the open position require a latching mechanism for setting and holding the contacts in a closed position. Likewise, switched electrical devices having contacts that are biased toward the closed position require a latching mechanism for setting and holding the contacts in an open position. Examples of conventional types of devices include devices of the circuit interrupting type, such as circuit breakers, arc fault interrupters, and GFCIs, to name a few.

As a result of GFCI devices being relatively small, when in the open position, the contacts may still be relatively close to each other. This may lead to slow plasma extinguishing, electrical arching, and relatively slow disconnections (e.g., opening) of the contacts. These conditions can result in high failure rates for the device due to residue build-up on the contacts which can lead to longer disconnect times and possibly permanent failure.

SUMMARY

The present invention solves such issues, by providing, in one embodiment, a wiring device including a face terminal for electrically connecting to an external load; a line terminal for electrically connecting to an external power supply; a load terminal for electrically connecting to a second external load; a face contact electrically connected to the face terminal; one or more line contact arms electrically connected to the line terminal; and one or more load contact arms electrically connected to the load terminal. Each line contact arm having an upper line contact located on a bent portion of the line contact arm, and a lower line contact located on a substantially straight portion of the line contact arm. Each load contact arm having a load contact located on a bent portion of the load contact arm. Wherein, the face contact and the upper line contact are electrically connected, and the lower line contact and the load contact are electrically connected, when the wiring device in is a closed position, and the face contact and the upper line contact are electrically disconnected, and the lower line contact and the load contact are electrically disconnected when the wiring device is in an open position.

In another embodiment the invention provides a wiring device including a face contact; one or more line contact arms; one or more load contact arms; and a fault detection circuit. The one or more line contact arms having an upper line contact located on a bent portion of the line contact arm, and a lower line contact located on a substantially straight portion of the line contact arm. The one or more load contact arms having a load contact located on a bent portion of the load contact arm. The fault detection circuit that detects a fault condition in said wiring device and generates a fault detection signal when said fault condition is detected, wherein said fault detection signal electrically disconnects the face contact from the upper line contact and the lower line contact from the load contact.

In yet another embodiment the invention provides a method of operating a wiring device. The method including providing a face contact; providing one or more line contact arms; and providing one or more load contact arms. Each line contact arm having an upper line contact located on a bent portion of the line contact arm, and a lower line contact located on a substantially straight portion of the line contact arm. Each load contact arm having a load contact located on a bent portion of the load contact arm. The method further including electrically connecting the face contact and the upper line contact; and electrically connecting the lower line contact and the load contact.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or carried out in various ways.

Figure 1:
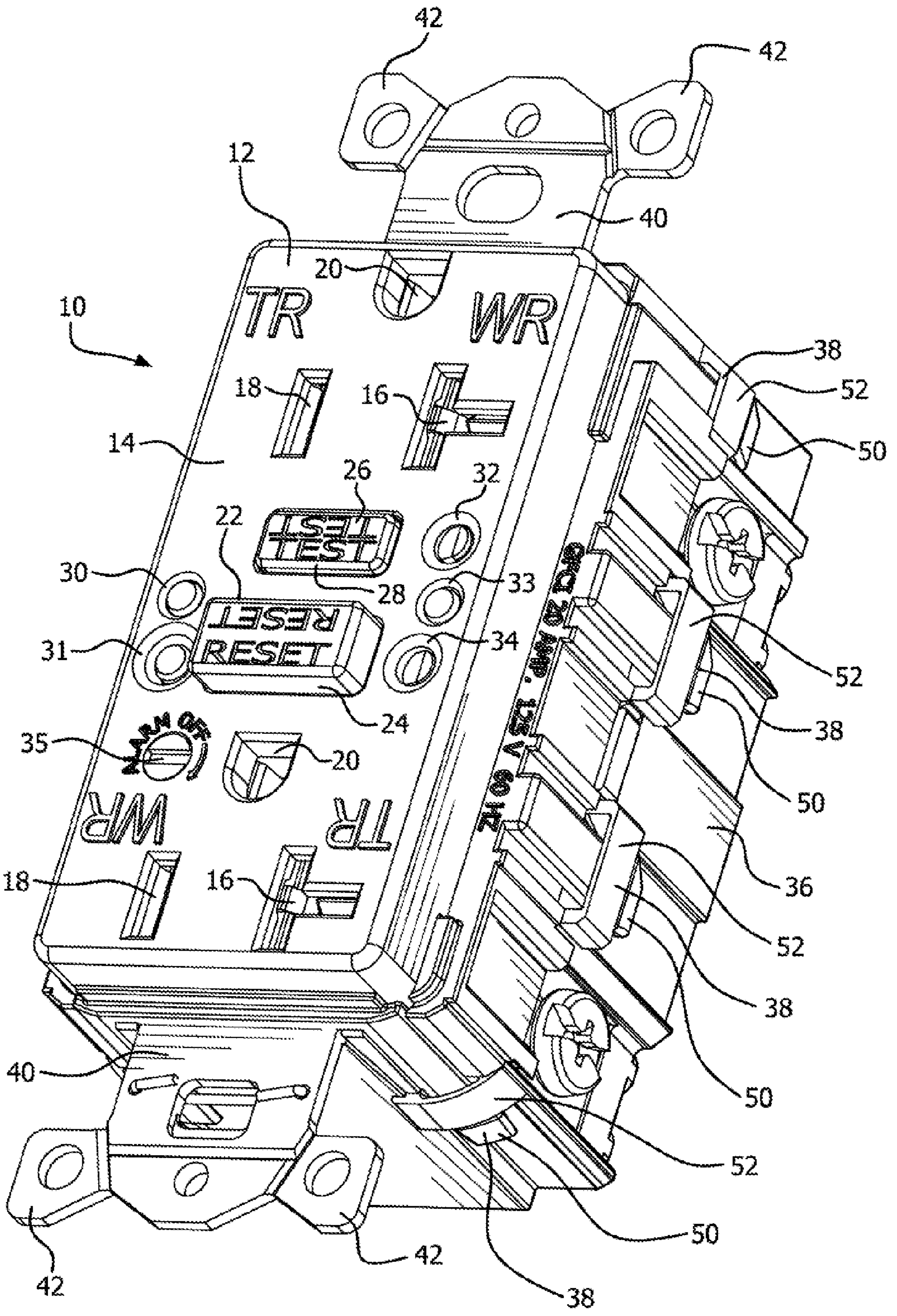
FIG. 1 is a side elevation view of a self-testing GFCI receptacle device in accordance with an exemplary embodiment of the present invention.

FIG. 1 illustrates a perspective view of a GFCI receptacle 10 according to one embodiment of the invention. The GFCI receptacle 10 includes a front cover 12 having a duplex outlet face 14 with a phase opening 16, a neutral opening 18, and a ground opening 20. The face 14 further has opening 22, accommodating a RESET button 24, an adjacent opening 24, accommodating a TEST button 28, and six respective circular openings 30-15. In some embodiments, openings 30 and 33 accommodate two respective indicators, such as but not limited to, various colored light-emitting diodes (LEDs). In some embodiments, openings 32 and 34 accommodate respective bright LEDs used, for example, as a nightlight. In some embodiments, opening 31 accommodates a photoconductive photocell used, for example, to control the nightlight LEDs. In some embodiments, opening 35 provides access to a set screw for adjusting a photocell device in accordance with this, as well as other, embodiments.

The GFCI receptacle 10 further includes a rear cover 36 secured to the front cover 12 by eight fasteners 38 (four fasteners 38 are shown in FIG. 1, while the other four fasteners 38 are obstructed from view). In some embodiments, the fasteners 38 include a barbed post 50 on the front cover 12 and a corresponding resilient hoop 52 on the rear cover 36, similar to that which is described in detail in U.S. Pat. No. 6,398,594, the entire contents of which are incorporated herein by reference for all that is taught. A ground yoke/bridge assembly 40 includes standard mounting ears 42 protruding from the ends of the GFCI receptacle 10.

Figure 2:
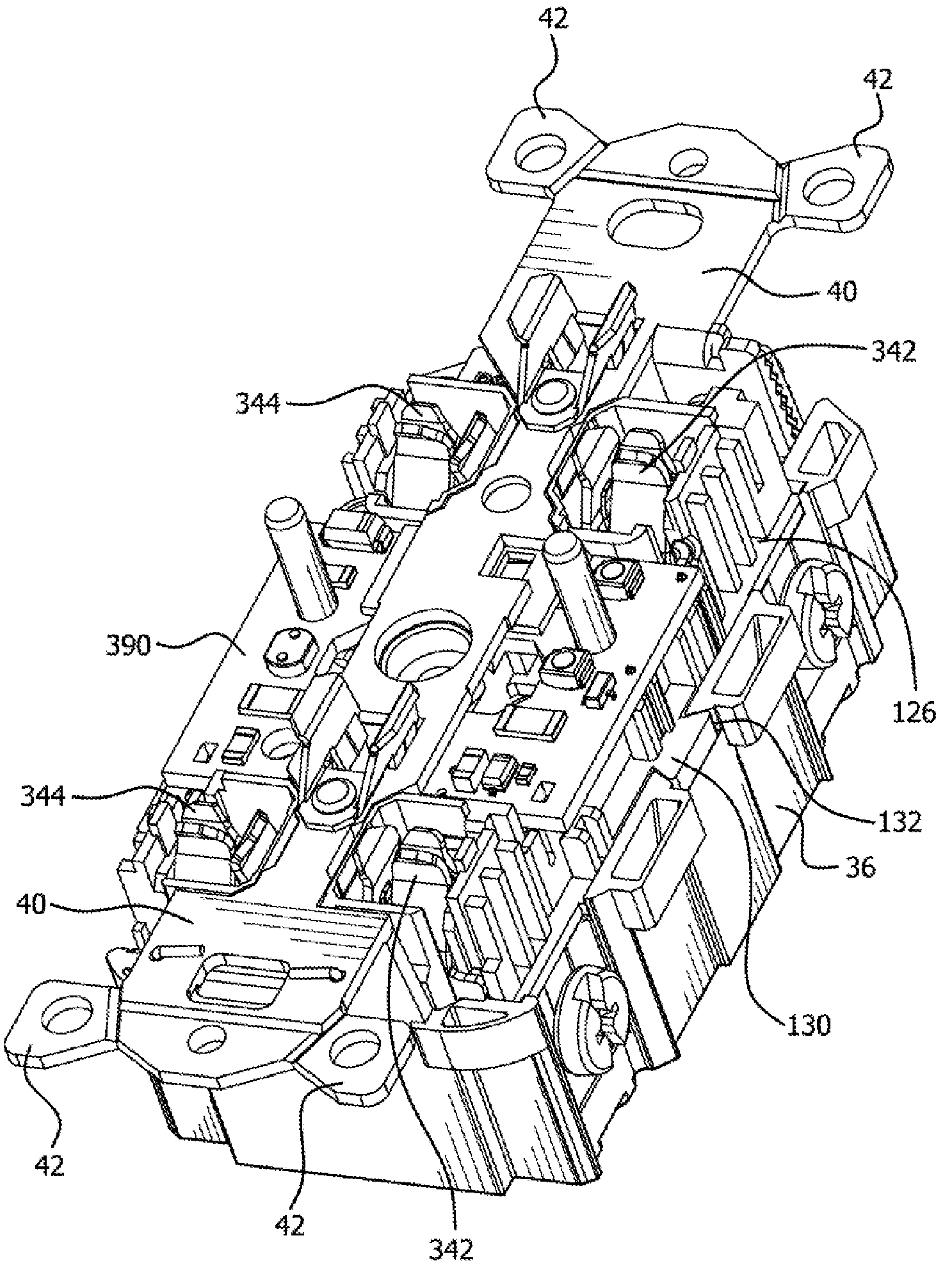
FIG. 2 is a side elevation view of the self-testing GFCI receptacle shown in FIG. 1 with the front cover of the housing removed.

FIG. 2 illustrates a perspective view of the GFCI receptacle 10 with the front cover 12 removed in order to expose manifold 126. Manifold 126 provides support for a printed circuit board 390 and the yoke/bridge assembly 40. According to one embodiment, manifold 126 includes four dovetail interconnects 130 that mate with corresponding cavities 132 along an upper edge of the rear cover 36. One dovetail-cavity pair is provided on each of the four sides of manifold 126 and rear cover 36, respectively.

Figure 3:
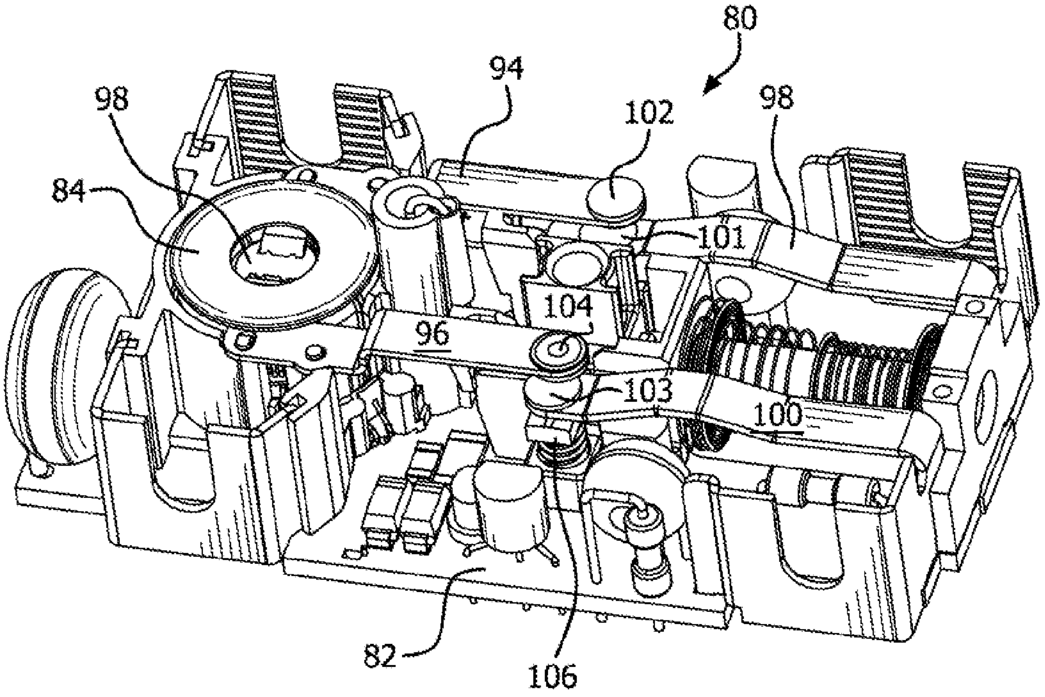
FIG. 3 is a side elevation view of a core assembly of the self-testing GFCI receptacle device shown in FIG. 1.

FIG. 3 is a side elevation view of a core assembly 80 according to one embodiment. Core assembly 80 includes a circuit board 82 that supports most of the working components of the receptacle, including the circuit shown in FIGS. 6A-6D, which are referred to collectively herein as FIG. 6, as well as a sense transformer 84 and a grounded neutral transformer 85 (not shown). Line contact arms 94, 96 pass through transformers 84, 85 with an insulating separator 98 there between. Line contact arms 94, 96 are cantilevered, their respective distal ends carrying phase and neutral line contacts 102, 104. Load contact arms 98, 100 are also cantilevered with their respective distal ends carrying phase and neutral load contacts 101, 103. The resiliency of the cantilevered contact arms biases the line contacts 102, 104 and load contacts 101, 103 away from each other. Load contact arms 98, 103 rest on a movable contact carriage 106, made of insulating (preferably thermoplastic) material.

Figure 4:
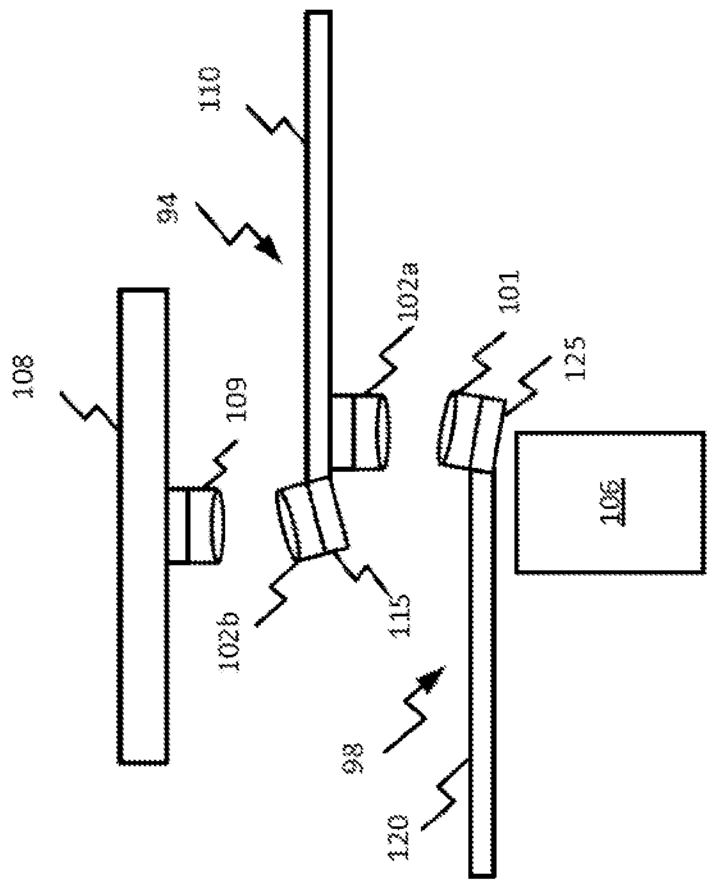
FIG. 4 is a side view of a line contact arm and a load contact arm of the GFCI receptacle shown in FIG. 1 in an open position.
Figure 5:
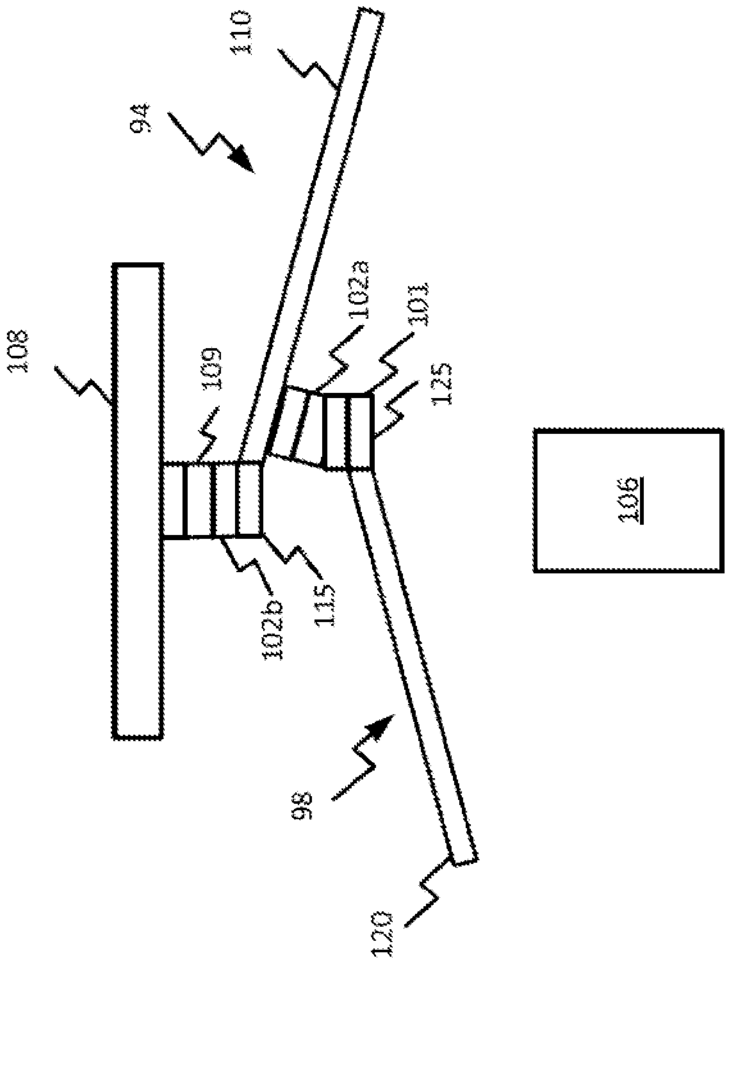
FIG. 5 is a side view of a line contact arm and a load contact arm of the GFCI receptacle shown in FIG. 1 in a closed position.
Figure 6A:
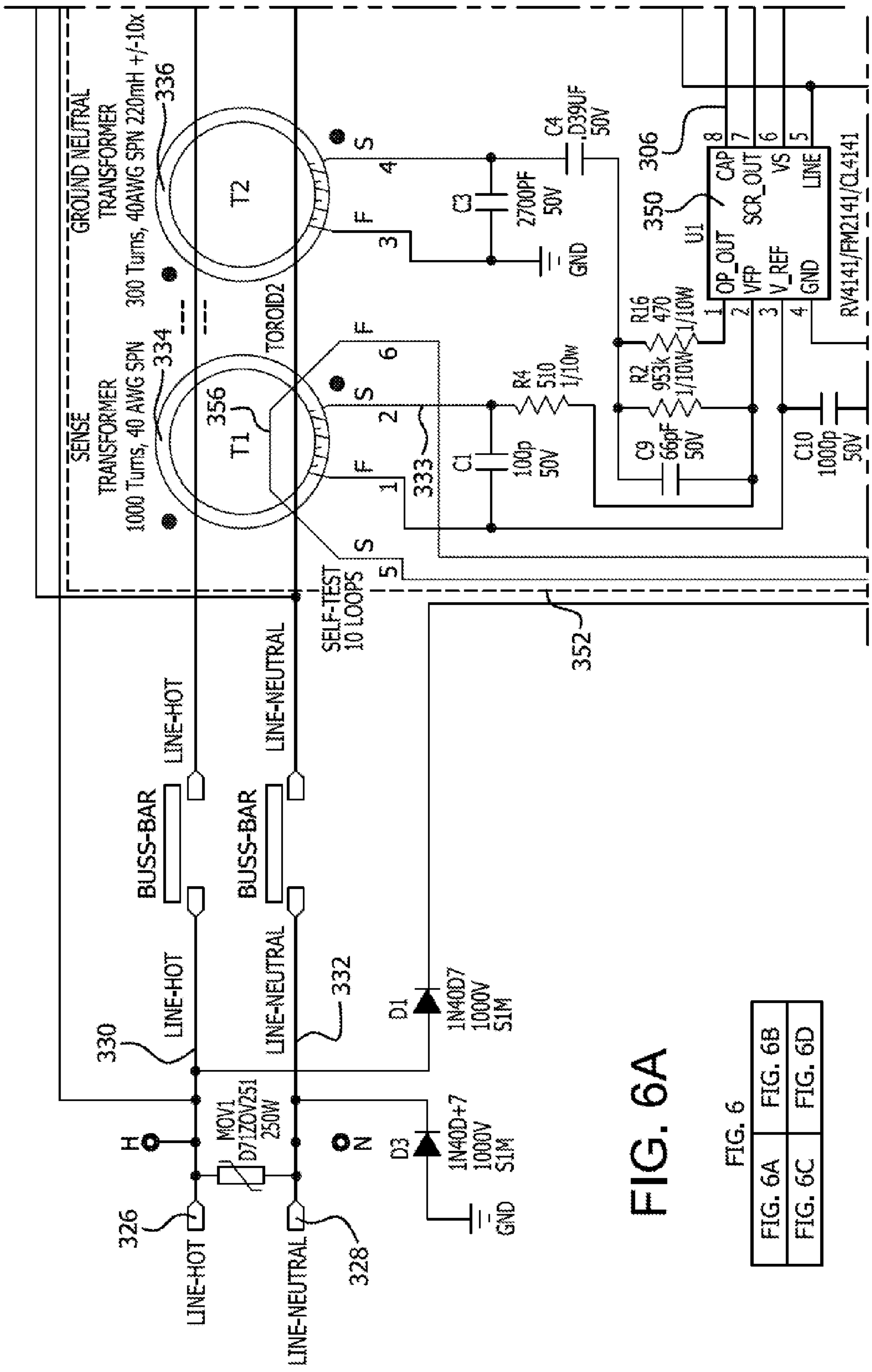
FIGS. 6A-6D is a schematic of an exemplary circuit consistent with an exemplary embodiment of the present invention.
Figure 6B:
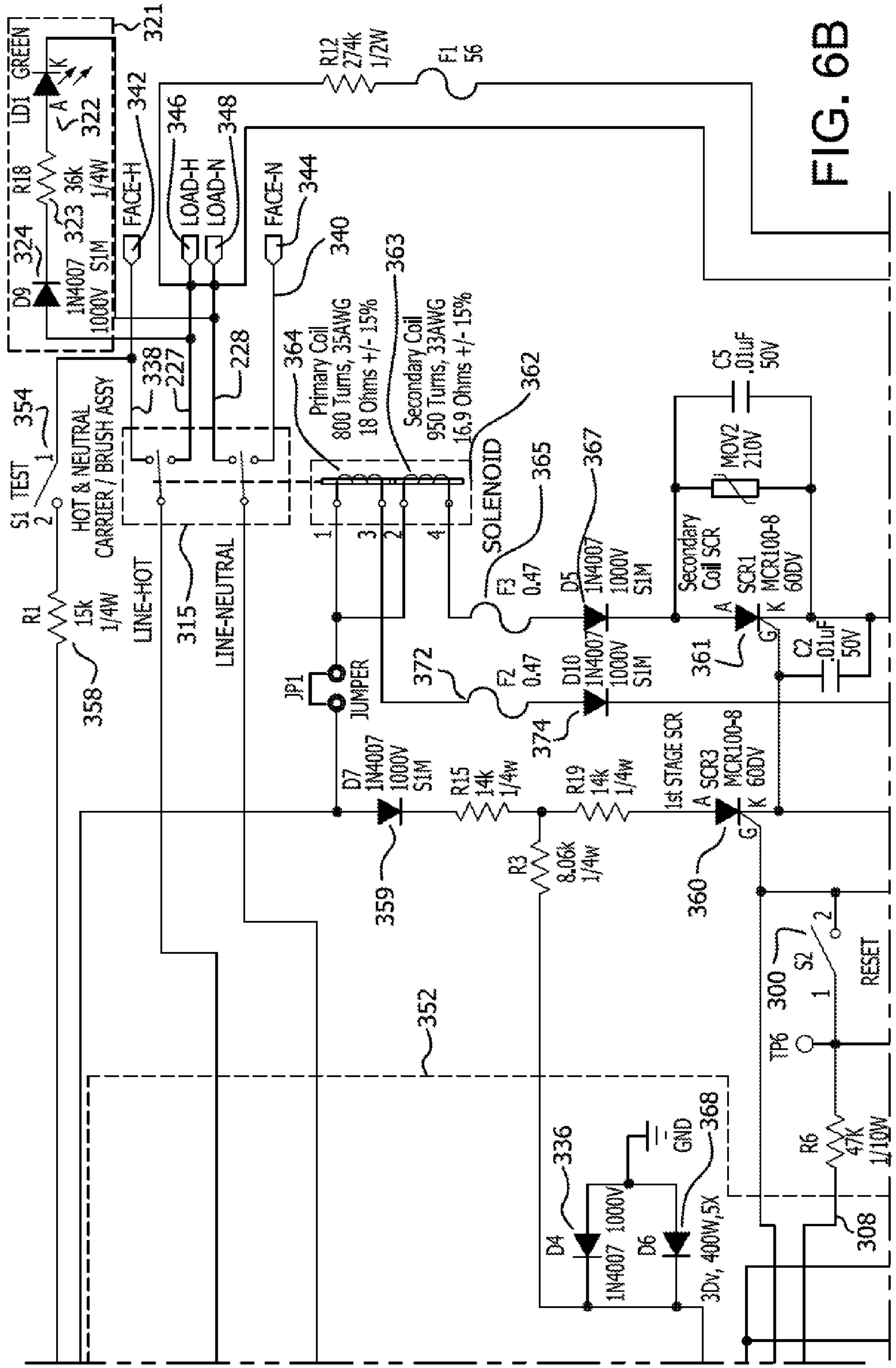
Figure 6C:
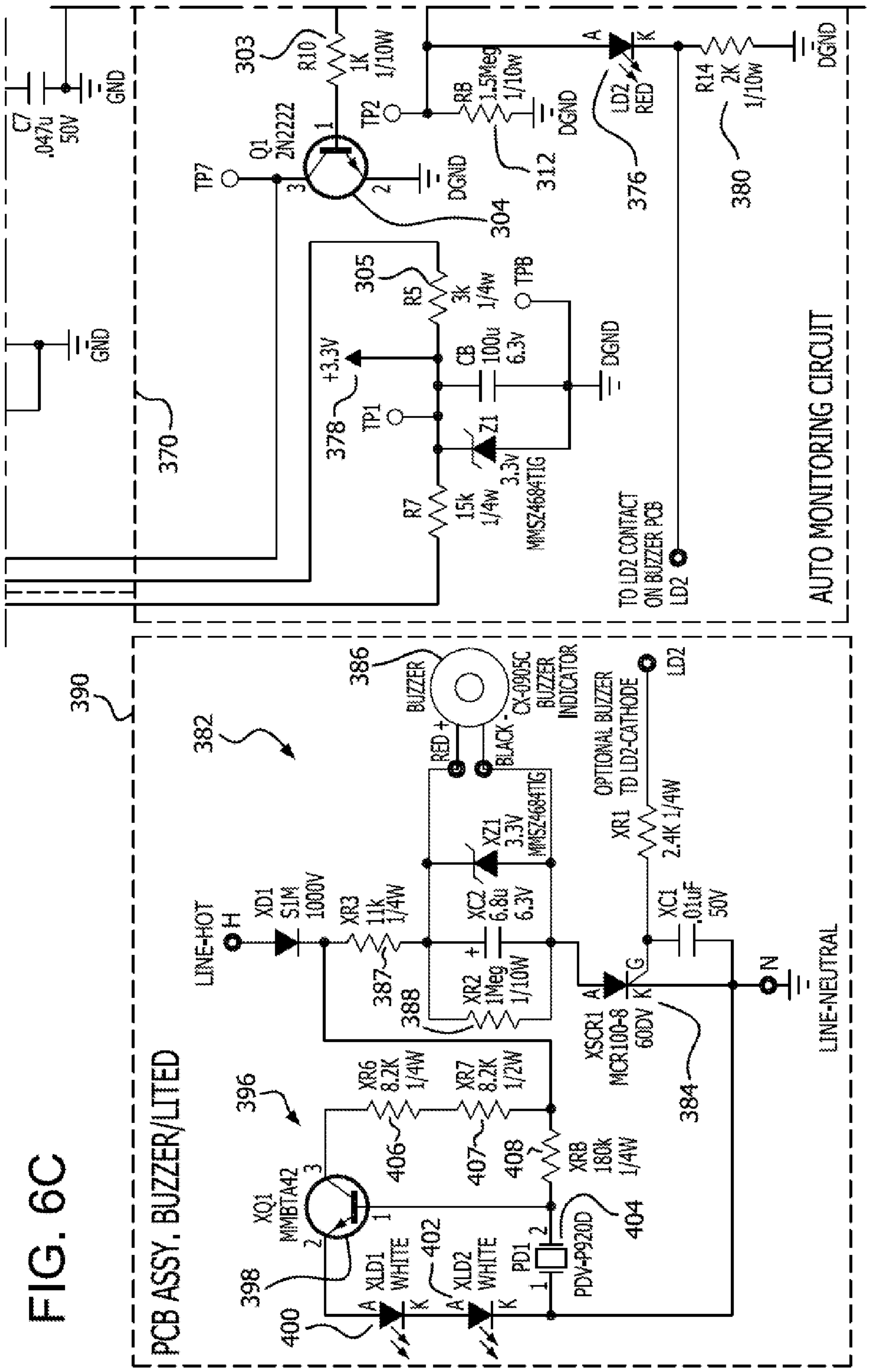
Figure 6D:
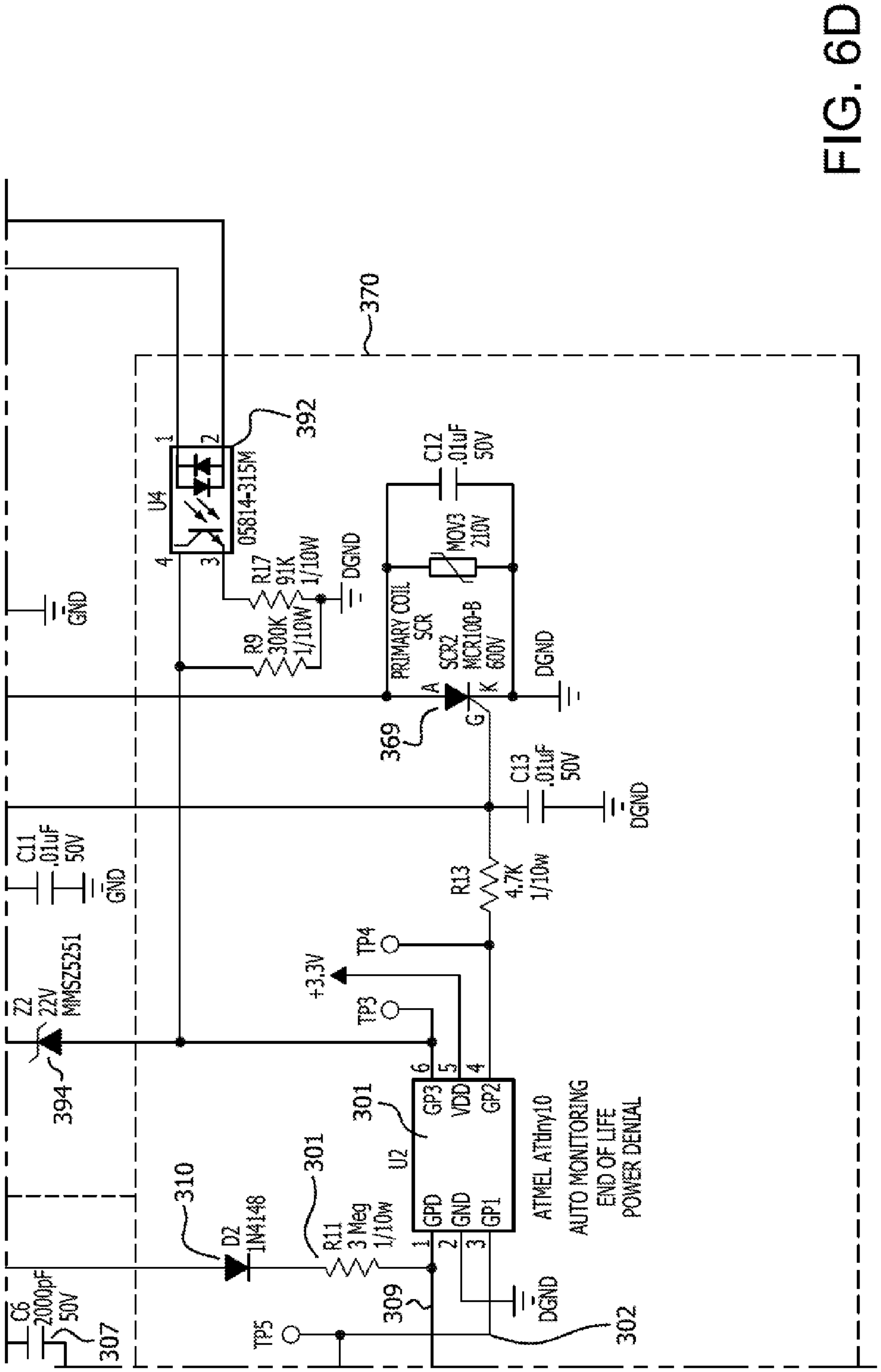

FIG. 4 is a side view of the line contact arm 94 and the load contact arm 98 in an open position, according to one embodiment. FIG. 4 further illustrates the load contact 101 (e.g., the phase load contact or neutral load contact), the line contact 102 (e.g., the phase line contact or the neutral line contact), the movable contact carriage, or latch housing, 106, a face 108, and a face contact 109 (e.g., a phase face contact or a neutral face contact). In some embodiments, the face 108 is the bottom portion of the manifold 126. Although not illustrated in FIG. 4, line contact arm 96, load contact arm 100, load contact 103 (e.g., the phase load contact or neutral load contact), and line contact 104 (e.g., the phase line contact or the neutral line contact), are constructed in a similar fashion as illustrated in FIGS. 4 and 5, and explained below. Also, it is noted that according to various embodiments the contact and contact arm configuration shown and described in regard to FIGS. 4 and 5 is also provided in the devices shown and described in regard to FIGS. 1-3.

The line contact arm 94 includes a first straight, or substantially straight, portion 110 and a first bent portion 115. The first straight portion 110 includes a lower line contact 102*a*, while the first bent portion 115 includes an upper line contact 102*b*. In some embodiments, the line contact arm 94 is bent at an angle of approximately three degrees, although, the line contact arm may be bent at an angle ranging from approximately three degrees to approximately six degrees. The lower line contact 102*a* may be coupled to the line contact arm 94 by inserting a hole prior to the upper line contact 102*b*. In some embodiments, the lower line contact 102*a* and the upper line contact 102*b* are coupled to the line contact arm 94 via riveting.

The load contact arm 98 includes a second straight, or substantially straight, portion 120 and a second bent portion 125. The second bent portion 125 having the load contact 101. In some embodiments, the load contact arm 98 is bent at an angle of approximately three degrees to approximately six degrees. In some embodiments, the load contact 101 is coupled to the load contact arm 98 via riveting.

FIG. 5 is a side view of the line contact arm 94 and the load contact arm 98 in a closed position, according to the embodiment of FIG. 4. The line contact arm 94 is bent down such that, when in the closed position, the upper line contact 102*b* is in a substantially flat contact with the face contact 109. Additionally, the load contact arm 98 is bent down such that, when in the closed position, the load contact 101 is in substantially flat contact with the lower line contact 102*a*.

In operation, when the line contact arms 94, 96 and load contact arms 98, 100 go from the closed position to an open position, or from the open position to the closed position, a wiping action is performed. Additionally, a moment of force is added by the bent portions of the contact arms of the when the line contact arms 94, 96 and load contact arms 98, 100 are in the reset condition. This wiping action and added moment of force allows for the contacts to float and maintain connection, even in the case of movement of the GFCI receptacle 10. The wiping action, the added moment of force, and the bent portions, result in relatively large openings between the contacts, relatively fast openings between the contacts when the device is tripped. The relatively large openings and relatively fast openings result in relatively fast plasma extinguishing which, among other things, reduces the possibility for arcing.

The relatively large openings, or space, between the contacts additionally allow for cooler operation of the GFCI receptacle 10 by allowing more air and surface cooling. The relatively large openings also prevent arcing between the contacts, which can occur in high voltage operation or if the brush arms lose spring forces. In some embodiments, when in the open position the contacts are approximately 0.060" away from each other. The bent portions of the line contact arms 94, 96 and load contact arms 98, 100 further move the contacts off of the movable contact carriage 106, thereby preventing any potential melting.

FIG. 6 (FIGS. 6A-6D) is a schematic drawing of an electrical circuit in accordance with one embodiment of the invention. The circuit shown in FIG. 6, or various subcircuits thereof, can be implemented in a variety electrical wiring devices, however, for purposes of description here the circuit of FIG. 6 is discussed in conjunction with its use in the GFCI receptacle device shown in FIGS. 1-5.

The circuit of FIG. 6 includes phase line terminal 326 and neutral line terminal 328 for electrical connection to an AC power source (not shown), such as a 60-hertz, 120 volt rms power source as used in the United States for mains power. The circuit of FIG. 6 and the software resident on and implemented therewith, can be modified to accommodate other power delivery systems as well. Such modifications and the resultant circuit and wiring device in which the circuit and software are would ultimately be used are contemplated by the inventor and considered to be within the spirit and scope of the invention described herein. For example, power delivery systems that use different voltages and frequencies are within the scope of the invention.

Referring to FIG. 6, phase conductor 330 and neutral conductor 332 are respectively connected to the line terminals and each pass through sense transformer 334 and grounded neutral transformer 336, which are part of a detection circuit described below. By way of example, line terminals correspond to input terminal screws 326, 328 in FIG. 1 above and line conductors 330, 332 represent line contact arms 94, 96, respectively, as described above with respect to FIG. 3. Each of line conductors 330, 332 has a respective fixed end connected to the line terminals and each includes a respective movable contact, e.g. contacts 102, 104 from the embodiment described above. Face phase and face neutral conductors 338, 340, respectively, include electrical contacts, e.g., contacts 109 from the embodiment described above, fixed thereto. The face conductors 338, 340 are electrically connected to and, in the embodiment shown are integral with, respective face terminals 342, 344, to which plug blades from a load device (not shown), such as an electrical appliance, would be connected when the electrical receptacle device is in use.

The circuit shown in FIG. 6 according to this embodiment also includes optional load phase and load neutral terminals 346, 348, respectively, which electrically connect to a downstream load (not shown), such as one or more additional receptacle devices. Load terminals 346, 348 are respectively connected to cantilevered load conductors 277, 278, each of which includes movable load contacts 101, 103 (FIGS. 4 and 5), at its distal end. The load contacts 101, 103 are disposed below respective line contacts 102, 104 (FIGS. 4 and 5) and face contacts 109 (FIGS. 4 and 5) and are coaxial with them such that when the line conductors are moved toward the load and face conductors, the three sets of contacts mate and are electrically connected together. When the device is in this condition it is said to be "reset" or in the reset state.

The Detector Circuit

With continued reference to FIG. 6, detector circuit 352 includes transformers 334, 336 as well as a GFCI integrated circuit device (GFCI IC), 350. In accordance with the present embodiment GFCI IC 350 is the well-known 4141 device, such as an RV4141 device made by Fairchild Semiconductor Corporation. Other GFCI IC devices could also be used in the circuit of FIG. 6 instead of the 4141 and such a modification is within the spirit and scope of the invention.

GFCI IC device 350 receives electrical signals from various other circuit components, including transformers 334, 336, and detects one or more kinds of faults, such as a real fault, a simulated fault or self-test ground fault, as well as a real or simulated grounded neutral fault. For example, when a sufficient current imbalance in line conductors 330, 332 occurs, a net current flows through the transformers 334, 336, causing a magnetic flux to be created about at least transformer 334. This magnetic flux results in electrical current being induced on conductor 333, which is wound around sense transformer 334. Respective ends of conductor 333 are connected to the positive and negative inputs to the sense amplifier of GFCI IC device 350 at input ports V-REF and VFB, respectively. The induced current on conductor 333 causes a voltage difference at the inputs to the sense amplifier of GFCI IC 350. When the voltage difference exceeds a predetermined threshold value, a detection signal is generated at one or more of outputs of GFCI IC 350, such as the SCR trigger signal output port (SCR_OUT). The threshold value used by GFCI IC 350 is determined by the effective resistance connected between the op-amp output (OP_OUT) and the positive input to the sense amplifier (VFB).

The current imbalance on line conductors 330, 332 results from either a real ground fault, a simulated ground fault or a self-test ground fault. A simulated ground fault is generated when test switch 354 in FIG. 6 closes, which occurs when TEST button 28 (FIG. 1) is pressed. As described in further detail below, a self-test fault occurs when auto-monitoring circuit 370 initiates an auto-monitoring test sequence that includes an electrical current being generated on independent conductor 356.

According to the present embodiment, when test switch 354 closes, some of the current flowing in line conductors 330, 332 and load conductors 338, 340 is diverted from the phase face conductor 338 (and phase load conductor 277 when the device is in the reset state) around sense transformer 334 and through resistor 358 to neutral line conductor 332. By diverting some of the current through resistor 358 in this manner, an imbalance is created in the current flowing through conductor 330 and the current flowing in the opposite direction through conductor 332. When the current imbalance, i.e., the net current flowing through the conductors passing through the sense transformer, exceeds a threshold value, for instance 4-5 milliamps, this simulated ground fault is detected by detector circuit 352 and the SCR output of GFCI IC 350 (SCR_OUT) is activated.

When the SCR output of GFCI IC 350 is activated, the gate of SCR 360 is turned ON allowing current to flow from the phase line conductor 330 through diode 359 and SCR 360. The current flowing through SCR 360 turns ON the gate of SCR 361 and SCR 369. When SCR 361 is turned ON, current flows from phase line conductor 330 through secondary coil 363 of dual-coil solenoid 362, fuse 365, diode 367 and SCR 361. Further, when SCR 369 is turned ON, current flows from phase line conductor 330 through primary coil 364 of dual-coil solenoid 362, fuse 372, diode 374 and SCR 369. The current flowing through both coils 363, 364 generates a magnetic field that moves an armature within solenoid 362. When the solenoid armature moves, it unlatches a contact carriage, (e.g., 106 in FIG. 3) which is part of interrupting device 315, and the carriage drops under the natural bias of line conductors 330, 332, that is, away from the face conductors 338, 340 and load conductors 277, 278. The device is now said to be "tripped," as a result of the successful manual simulated fault test sequence, and the device will not deliver power to a load until it is reset. The time it takes from the instant switch 354 closes until the device is tripped and current no longer flows from phase line conductor 330 to either the face and load conductors and through solenoid coils 363, 364, is so short that fuses 365, 372 remain intact.

Manual Testing Via the Reset Operation

With continued reference to FIG. 6, closing reset switch 300, e.g., by pressing RESET button 24 (FIG. 1), also initiates a test operation. Specifically, when reset switch 300 closes, a voltage supply output, VS, of GFCI IC 350 is electrically connected to the gate of SCR 360 through conductor 308, thus, turning ON SCR 360. When SCR 360 is turned ON, current is drawn from line conductor 330 through diode 359 and SCR 360 and ultimately to ground. Similar to when SCR 360 is turned ON by pressing the TEST button, as discussed previously, turning ON SCR 360 by pressing the RESET button results in SCR 361 and SCR 369 also being turned ON and current flowing through solenoid coils 363, 364. The current flowing through coils 363, 364 of solenoid 362 generates a magnetic field at the solenoid and the armature within the solenoid is actuated and moves. Under typical, e.g., non-test, conditions, the armature is actuated in this manner to trip the device, such as when an actual fault occurs.

When reset switch 300 closes, however, the device is likely already in the tripped condition, i.e., the contacts of the line, face and load conductors are electrically isolated. That is, the RESET button is usually pressed to re-latch the contact carriage and bring the line, face and load contacts back into electrical contact (illustrated in FIG. 5) after the device has tripped. If the armature of solenoid 362 fails to fire when the RESET button is pressed, and the reset mechanism, including the contact carriage, fails to engage the reset plunger on its return after the RESET button is released, the device will not reset. Accordingly, if, for example, the device has not been wired to the AC power lines, or it has been mis-wired, that is, the device has been wired with the AC power not connected to the line terminals, 326, 328, no power is applied to the GFCI IC 350. If no power is applied to GFCI IC 350, the gate of SCR 360 cannot be driven, either by the SCR output of GFCI IC 350 or when the REST button is pressed. Under this condition the device will not be able to be reset. The mis-wire condition is prevented in accordance with a wiring device consistent with the present embodiment by ensuring the device is shipped to the user in the tripped condition. Because the device cannot be reset until AC power is properly applied to the line terminals, the mis-wire condition is prevented.

The Auto-Monitoring Circuit

With continued reference to the exemplary circuit schematic shown in FIG. 6, auto-monitoring circuit 370 includes a programmable device 301. Programmable device 301 can be any suitable programmable device, such as a microprocessor or a microcontroller, which can be programmed to implement the auto-monitoring routine as explained in detail below. For example, according to the embodiment shown in FIG. 6, programmable device 301 is implemented by an ATMEL™ microcontroller from the ATtiny 10 family. It could also be implemented by a Microchip microcontroller such as a PIC10F204/206.

According to one exemplary auto-monitoring, or automatic self-testing, routine in accordance with the embodiment shown in FIG. 6, microcontroller 301 initiates the auto-monitoring routine approximately every three (3) seconds by setting a software auto-monitoring test flag. The auto-monitoring test flag initiates the auto-monitoring routine within the circuit interrupting device and confirms that the device is operating properly or, under certain circumstances, determines that the circuit interrupting device has reached its end-of-life (EOL). When the auto-monitoring routine runs with a positive, i.e., successful, result, the auto-monitoring circuit enters a hibernation state until microcontroller 301 sets the test flag again and initiates another auto-monitoring routine.

If the auto-monitoring routine runs with a negative result, e.g., it cannot be determined that the circuit interrupting device is functioning properly or it determines that it is, in fact, not operating properly, a failure counter is incremented and microcontroller 301 initiates another auto-monitoring routine when instructed by the software program stored in memory within the device. In addition to the failure count being incremented, a temporary indication of the failure is also provided. For example, according to the present embodiment, when such a failure occurs, I/O port GPO of microcontroller 301 is controlled to be an output and light emitting diode (LED) 376 is controlled to flash, e.g., one or more times, to indicate the failure to a user. If the failure counter reaches a predetermined value, i.e., the auto-monitoring routine runs with a negative result a certain number of times, the number being stored and implemented in software, the auto-monitoring routine invokes an end-of-life (EOL) sequence. The EOL sequence includes one or more of the following functions; (a) indicate that EOL has been reached, for example, by continuously flashing or illuminating an indicator light and/or generating an audible sound, (b) attempt to trip the device, (c) prevent an attempt to reset the device, (d) store the EOL event on non-volatile memory, e.g., in the event there is a power failure, and (e) clear the EOL condition when the device is powered down.

In accordance with this embodiment, when the auto-monitoring software determines it is time to run the auto-monitoring routine, i.e., based on the auto-monitor timer, a stimulus signal 302 is turned ON at I/O port GP1 of microcontroller 301. When the stimulus signal is turned ON, electrical current flows through resistor 303 and a voltage is established at the base of transistor 304, turning the transistor ON. When transistor 304 is turned ON, current flows from dc voltage supply 378 through resistor 305, which is, for example, a 3 k-ohm resistor, and continues through electrical conductor 356 and transistor 304 to ground. Regarding dc voltage source 378, according to the present embodiment the value of this voltage source is designed to be between 4.1 and 4.5 volts dc, but the value of this voltage supply can be any other suitable value as long as the value used is adequately taken into account for other circuit functionality described below.

According to this exemplary embodiment, electrical conductor 356 is a wire, but it could also be a conductive trace on a printed circuit board. Conductor 356 is connected at one end to resistor 305, traverses through sense transformer 334 and is looped approximately ten (10) times around the core of the transformer and connected at its other end to the collector of transistor 304. Thus, when the software auto-monitoring test flag is set in microcontroller 301 and transistor 304 is turned ON, current flows through conductor 356 which comprises an independent conductor separate from phase line conductor 330 and neutral line conductor 332, which also traverse through the center of sense transformer 334.

If the circuit interrupting device according to the present embodiment is functioning properly, as current flows through conductor 356 and through the sense transformer a magnetic flux is generated at sense transformer 334. The flux generates a signal on conductor 333 which is detected by detection circuit 352, including GFCI IC device 350. In accordance with this embodiment, when device 350 detects the flux created at sense transformer 334, a voltage level is increased at one of the I/O ports of device 350, for example at the output port labeled CAP in FIG. 6, thus increasing the voltage on conductor 306.

According to this embodiment, capacitor 307 is connected between the CAP I/O port of microcontroller 301 and ground. As is known in the art, attaching a capacitor directly between the CAP output of a 4141 GFCI IC device and ground causes the SCR trigger signal (SCR_OUT) output from GFCI IC device 350 to be delayed by a predetermined period of time. The amount of time the trigger signal is delayed is typically determined by the value of the capacitor. According to the present embodiment, however, capacitor 307 is not connected directly between the CAP output and ground. Instead, capacitor 307 is also connected to the ADC I/O port GPO of microcontroller 301 via a circuit path that includes diode 310 in series with resistor 311, e.g., 3 M-Ohm, which completes a voltage divider circuit with resistor 312, e.g., 1.5 M-Ohm. This additional circuitry connected to the capacitor at the CAP output of GFCI IC device 350 drains current from the delay capacitor.

By measuring the value of the signal at ADC I/O port (GP0) and confirming it is above a certain level, it can be determined whether or not the self-test fault signal generated on conductor 356 was properly detected by detection circuit 352 and it can further be confirmed whether GFCI IC device 350 is capable of generating the appropriate SCR trigger signal. Also, to avoid tripping the device during a self-test auto-monitoring fault, the voltage at capacitor 307 is measured and proper self-test fault detection is confirmed before a drive signal is output at SCR_OUT of GFCI IC device 350.

If the current drain on capacitor 307 is too high, GFCI IC device 350 may not operate properly. For example, if as little as 3-4 microamps of current is drained from capacitor 307, grounded neutral conditions, which are also intended to be detected by GFCI IC device 350, may not be accurately detected, e.g., pursuant to UL requirements, because the SCR trigger signal (SCR_OUT) will not fire within the necessary amount of time. According to the present embodiment, less than about 1.3 microamps, or about 5% of the specified delay current for the GFCI IC device 350, is drained for the ADC I/O port GP0 of microcontroller 301. This small current drain from capacitor 307 has no effect on the ability of the device to properly detect real ground faults and/or real grounded neutral faults.

According to this embodiment, approximately 50 nanoamps of current is drawn off of capacitor 307. Parallel resistors 311 and 312 connected to the ADC I/O port GP0 of microcontroller 301 create a 4.5 megaohm drain which limits the current pulled from capacitor 307 to a maximum of 1.0 microamp. GFCI IC device 350 uses approximately 40 microamps of current to generate the SCR trigger but microcontroller 301 only requires approximately 50 nanamps to read the SCR trigger signal off of capacitor 307 before the SCR trigger signal is output from SCR_OUT. Accordingly, by selecting the proper value for capacitor 307, in conjunction with appropriate value selections for resistors 311 and 312, as well as diode 310, it is possible to maintain the correct delay for the SCR trigger signal (SCR_OUT) from GFCI IC device 350 and use the ADC in microcontroller 301 to measure the signal at ADC input (GP0) to determine whether the test signal on conductor 356 has been properly detected by detection circuit 352.

It should also be noted that in the embodiment shown in FIG. 6, LED 376 is also connected to ADC I/O port (GP0) of microcontroller 301. Accordingly, whether or not LED 376 is conducting or not will affect the drain on capacitor 307, as well as the delay of the SCR trigger signal and the ability of microcontroller 301 to properly measure the signal output from the CAP I/O port of GFCI IC device 350. Thus, in regard to the circuit shown in FIG. 6, LED 376 is selected such that it does not turn ON and begin conducting during the time microcontroller 301 is measuring the signal from the CAP output of GFCI IC device 350. For example, LED 376 is selected such that its turn-ON voltage is about 1.64 volts, or higher which, according to the circuit shown in FIG. 6, can be measured at I/O port GP0. Additionally, to prevent any signal adding to capacitor 307 when LED 376 is being driven, diode 310 is provided.

According to this embodiment, the circuit path that includes diode 310 and the voltage divider, 311, 312, is connected to I/O port GP0 of microcontroller 301, which serves as an input to an analog-to-digital converter (ADC) within microcontroller 301. The ADC of microcontroller 301 measures the increasing voltage established by the charging action of capacitor 307. When a predetermined voltage level is reached, microcontroller 301 turns OFF the auto-monitoring stimulus signal 302 which, in turn, turns OFF transistor 304, stopping the current flow on conductor 356 and, thus, the flux created at sense transformer 334. When this occurs, it is determined by microcontroller 301 that a qualified auto-monitoring event has successfully passed and the auto-monitoring fail counter is decremented if the present count is greater than zero.

In other words, according to this embodiment an auto-monitoring routine is repeated by microcontroller 301 on a predetermined schedule. Based on the software program stored in memory within microcontroller 301, the auto-monitoring routine is run, as desired, anywhere from every few seconds to every month, etc. When the routine is initiated, the flux created at sense transformer 334 occurs in similar fashion to the manner in which flux would be created if either an actual ground fault had occurred or if a simulated ground fault had been manually generated, e.g., by pressing the TEST button as described above.

There is a difference; however, between an auto-monitoring (self-test) fault generated by the auto-monitoring routine and either an actual ground fault or a simulated fault generated by pressing the TEST button. When either an actual or simulated ground fault occurs, a difference in the current flowing in the phase and neutral conductors, 330 and 332, respectively, should be generated. That is, the current on conductor 330 should be different than the current on conductor 332. This differential current flowing through sense transformer 334 is detected by GFCI IC device 350, which drives a signal on its SCR_OUT I/O port to activate the gate of SCR 360 and turn it ON. When SCR 360 turns ON, current is drawn through coils 363, 364 which causes interrupting device 315 to trip, causing the contact carriage to drop which, in turn, causes the line, face and load contacts to separate from each other (as illustrated in FIG. 4). Thus, current is prevented from flowing through phase and neutral conductors 330, 332 to the phase and neutral face terminals 342, 344, and the phase and neutral load terminals 346, 348, respectively.

In comparison, when the auto-monitoring routine is performed in accordance with the present invention, no differential current is created on the phase and neutral conductors 330, 332 and the interrupting device 315 is not tripped. Instead, during the auto-monitoring routine, the flux generated at sense transformer 334 is a result of current flowing through conductor 356, which is electrically separated from phase and neutral conductors 330, 332. The current generated on conductor 356 is present for only a brief period of time, for example, less than the delay time established by capacitor 307, discussed previously.

If the voltage established at the input to the ADC input (GP0) of microcontroller 301 reaches a programmed threshold value within this predetermined period of time during an auto-monitoring routine, it is determined that the detection circuit 352 successfully detected the current flowing through the core of sense transformer 334 and the auto-monitoring event is deemed to have passed. Microcontroller 301, thus, determines that detection circuit 352, including GFCI IC device 350, is working properly. Because the current flowing through sense transformer 334 during the auto-monitoring routine is designed to be substantially similar in magnitude to the differential current flowing through the transformer during a simulated ground fault, e.g., 4-6 milliamps, it is determined that detection circuit 352 would be able to detect an actual ground fault and provide the proper drive signal to SCR 360 to trip interrupter 315.

Alternatively, auto-monitoring circuit 370 might determine that the auto-monitoring routine failed. For example, if it takes longer than the predetermined period of time for the voltage at the ADC input at GP0 of microcontroller 301 to reach the given voltage during the auto-monitoring routine, it is determined that the auto-monitoring event failed. If this occurs, an auto-monitoring fail tally is incremented and the failure is indicated either visually or audibly. According to one embodiment, the ADC port (GP0) of microcontroller 301 is converted to an output port when an auto-monitoring event failure occurs and a voltage is placed on conductor 309 via I/O port GP0, which is first converted to an output port by the microcontroller. This voltage at GP0 generates a current on conductor 309 that flows through indicator LED 376 and resistor 380 to ground. Subsequently, ADC I/O port (GP0) of microcontroller 301 is converted back to an input port and remains ready for the next scheduled auto-monitoring event to occur.

According to this embodiment, when an auto-monitoring event failure occurs, indicator LED 376 illuminates only for the period of time when the I/O port is converted to an output and an output voltage is generated at that port; otherwise LED 376 remains dark, or non-illuminated. Thus, if the auto-monitoring routine is run, for example, every three (3) seconds, and an event failure occurs only a single time or sporadically, the event is likely to go unnoticed by the user. If, on the other hand, the failure occurs regularly, as would be the case if one or more of the components used in the auto-monitoring routine is permanently disabled, indicator LED 376 is repetitively turned ON for 10 msec and OFF for 100 msec by microcontroller 301, thus drawing attention to the device and informing the user that critical functionality of the device has been compromised. Conditions that cause the auto-monitoring routine to fail include one or more of the following, open circuited differential transformer, closed circuited differential transformer, no power to the GFCI IC, open circuited solenoid, SCR trigger output of the GFCI IC continuously high, and SCR output of the GFCI IC continuously low.

According to a further embodiment, if the auto-monitoring fail tally reaches a predetermined limit, for example, seven (7) failures within one (1) minute, microcontroller 301 determines that the device is no longer safe and has reached its end-of-life (EOL). If this occurs, a visual indicator is activated to alert the user that the circuit interrupting device has reached the end of its useful life. For example, when this EOL state is determined, the ADC I/O port (GP0) of microcontroller 301 is converted to an output port, similar to when a single failure is recorded as described above, and a signal is either periodically placed on conductor 309 via GP0, i.e., to blink LED 376 at a rate of, for example, 10 msec ON and 100 msec OFF, or a signal is continuously placed on conductor 309 to permanently illuminate LED 376. The auto-monitoring routine is also halted at this time.

In addition to the blinking or continuously illuminated LED 376, according to a further embodiment when EOL is determined, an optional audible alarm circuit 382 on printed circuit board (PCB) 390 is also activated. In this situation the current through LED 376 establishes a voltage on the gate of SCR 384 such that SCR 384 is turned ON, either continuously or intermittently, in accordance with the output signal from GP0 of microcontroller 301. When SCR 384 is ON, current is drawn from phase line conductor 330 to activate audible alarm 386 (e.g., a buzzer) providing additional notice to a user of the device that the device has reached the end of its useful life, i.e., EOL. For example, with respect to the present embodiment, audible alarm circuit 382 includes a parallel RC circuit including resistor 387 and capacitor 388. As current is drawn from phase line conductor 330, capacitor 388 charges and discharges at a rate controlled by the value of resistor 387 such that buzzer 386 sounds a desired intermittent alarm.

A further aspect of this embodiment includes dimmable LED circuit 396. Circuit 396 includes transistor 398, LEDs, 400, 402, light sensor 404 (e.g., a photocell) and resistors 406-408. When the ambient light, e.g., the amount of light in the vicinity of the circuit interrupting device according to the present embodiment, is rising, light sensor 404 reacts to the ambient light level to apply increasing impedance to the base of transistor 398 to dim the LEDs as the ambient light increases. Alternatively, when the ambient light decreases, e.g., as night begins to fall, the current flowing through sensor 404 increases, accordingly. As the ambient light level decreases, LEDs 400 and 402 illuminate brighter and brighter, thus providing a controlled light level in the vicinity of the device.

A further embodiment of the invention shown in FIG. 6 includes a mechanism for providing microcontroller 301 with data related to whether the device is tripped or in the reset condition. As shown in FIG. 6, opto-coupler 392 is connected between phase and neutral load conductors 277, 278 and I/O port (GP3) of microcontroller 301. Microcontroller 301 uses the value of the signal (voltage) at port GP3 to determine whether or not GFCI IC device 350 is being supplied with power and whether the device is tripped or in the reset condition. When GFCI IC device 350 is powered, e.g., via its voltage input port (LINE), which occurs when AC power is connected to line terminals 326, 328, a voltage is generated at the output port (VS). This voltage is dropped across Zener diode 394, which is provided to maintain the voltage supplied to the microcontroller within an acceptable level. Diodes 366, 368, connected between the phase line conductor and power supply input port (LINE) of GFCI IC 350 ensures that the voltage level supplied to GFCI IC and the VS output remain below approximately 30 volts. The voltage signal dropped across Zener diode 394 is connected to input port GP3 of microcontroller 301. If microcontroller 301 does not measure a voltage at GP3, it determines that no power is being supplied by GFCI IC device 350 and declares EOL.

Alternatively, if microcontroller 301 measures a voltage at GP3, it determines whether the device is tripped or in the reset state based on the value of the voltage. For example, according to the circuit in FIG. 6, if the voltage at GP3 is measured to be between 3.2 and 4.0 volts, e.g., between 76% of VCC and 100% of VCC, it is determined that there is no power at the face (342, 344) and load (346, 348) contacts and, thus, the device is in the tripped state. If the voltage at GP3 is between 2.4 and 2.9 volts, e.g., between 51% of VCC and 74% of VCC, it is determined that there is power at the face and load contacts and the device is in the reset state.

According to a further embodiment, when EOL is determined, microcontroller 301 attempts to trip interrupting device 315 in one or both of the following ways: (a) by maintaining the stimulus signal on third conductor 356 into the firing half-cycle of the AC wave, and/or, (b) by generating a voltage at an EOL port (GP2) of microcontroller 301. When EOL has been declared, e.g., because the auto-monitoring routine fails the requisite number of times and/or no power is being supplied from the supply voltage output (VS) of GFCI IC device 350, microcontroller 301 produces a voltage at EOL port (GP2). Optionally, microcontroller 301 can also use the value of the input signal at GP3, as described above, to further determine whether the device is already in the tripped state. For example, if microcontroller 301 determines that the device is tripped, e.g., the load and face contacts are not electrically connected to the line contacts (as illustrated in FIG. 4), microcontroller 301 may determine that driving SCR 369 and/or SCR 361 in an attempt to open the contacts and trip the device is unnecessary and, thus, not drive SCR 369 and SCR 361 via GP2.

The voltage at GP2 directly drives the gate of SCR 369 and/or SCR 361 to turn SCR 369 and/or SCR 361 ON, thus, enabling it to conduct current and activate solenoid 362. More specifically, when SCR 369 and/or SCR 361 are turned ON, current is drawn through coil 364 of dual coil solenoid 362. For example, dual coil solenoid 362 includes inner primary coil 364, which comprises an 800 turn, 18 Ohm, 35 AWG coil, and outer secondary coil 363, which includes a 950 turn, 16.9 Ohm, 33 AWG coil. Further details of the construction and functionality of dual coil 362 can be found in U.S. patent application Ser. No. 13/422,797, assigned to the same assignee as the present application, the entire contents of which are incorporated herein by reference for all that is taught.

As described above, when it is determined via the auto-monitoring routine that detection circuit 352 is not successfully detecting ground faults, e.g., it does not detect the flux resulting from current flowing in conductor 356, or it is not otherwise generating a drive signal at the SCR_OUT output port of GFCI IC device 350 to drive the gate of SCR 360 upon such detection, microcontroller 301 determines EOL and attempts to trip interrupting device 315 by methods mentioned above. Specifically, microcontroller 301 attempts to directly trip directly driving the primary coil 364, by the back-up path GP2 to SCR369 and SCR361. There is at least one difference, however, between the signal on conductor 356 when the auto-monitoring routine is being run normally, and the signal on conductor 356 generated when EOL is determined. That is, under EOL conditions, GP2 energizes both SCR361 and SCR 369 to be triggered and coil 362 and coil 363 to be energized, thus activating solenoid 362 and 369 to trip interrupting device 315.

If interrupting device 315 is opened, or if interrupting device 315 was otherwise already open, power-on indicator circuit 321 will be OFF. For example, in the embodiment shown in FIG. 6, power-on indicator circuit 321 includes LED 322 in series with resistor 323 and diode 324. The cathode of LED 322 is connected to the neutral load conductor 278 and the anode of diode 324 is connected to phase load conductor 277. Accordingly, when power is available at the load conductors, that is, the device is powered and in the reset state, current is drawn through the power-on circuit on each alternating half-cycle of AC power, thus, illuminating LED 322. If, on the other hand, power is not available at the load conductors 277, 278, for example, because interrupting device 315 is open, or tripped, or the device is reset but no power is being applied, LED 322 will be dark, or not illuminated.

Additional embodiments and aspects thereof, related to the auto-monitoring functionality consistent with the present invention, as well as further discussion of some of the aspects already described, are provided below.

The sinusoidal AC waveform discussed herein is connected to the phase and neutral line terminals 326, 328 when the self-test GFCI device is installed correctly. According to one embodiment the AC waveform is a 60 Hz signal that includes two half-cycles, a positive 8.333 millisecond half-cycle and a negative 8.333 millisecond half-cycle. The so-called “firing” half-cycle refers to the particular half-cycle, either positive or negative, during which a gate trigger signal to SCR 360 results in the respective gates of SCR 361 and SCR 369 being driven and the corresponding respective solenoid coils 363, 364 conducting current, thus, “firing” solenoid 362 and causing the armature of the solenoid to be displaced. A “non-firing” half-cycle refers to the alternate half-cycle of the AC waveform, i.e., either negative or positive, during which current does not flow through the SCR or its respective solenoid coil, regardless of whether or not the SCR gate is triggered. According to the present embodiment, whether the positive or negative half-cycle is the firing half-cycle is determined by a diode, or some other switching device, placed in series with the respective solenoid coil. For example, in FIG. 6, diodes 359, 374 and 367 are configured such that the positive half-cycle is the “firing” half-cycle with respect to SCRs 360, 369 and 361, respectively.

According to a further embodiment of a circuit interrupting device consistent with the invention, microcontroller 301 optionally monitors the AC power input to the device. For example, the 60 Hz AC input that is electrically connected to the phase and neutral line terminals 326, 328 is monitored.

More particularly, a full 60 Hz AC cycle takes approximately 16.333 milliseconds to complete. Thus, to monitor and confirm receipt and stabilization of the AC waveform, a timer/counter within microcontroller 301 is implemented. For example, within the three (3) second auto-monitoring window the 60 Hz input signal is sampled once every millisecond to identify a leading edge, i.e., where the signal goes from negative to positive values. When a leading edge is detected a flag is set in the software and a count is incremented. When the three (3) second test period is finished, the count result is divided by 180 to determine whether the frequency is within a specified range. For example, if the frequency is stable at 60 Hz, the result of dividing by 180 would be 1.0 because there are 180 positive edges, and 180 cycles, in three (3) seconds worth of a 60 Hz signal. If the frequency is determined to not be within a given range, for example, 50-70 Hz, the auto-monitoring self-test fault testing is stopped, but the monitoring of GP3 continues. Accordingly, a premature or errant power failure determination is avoided when a circuit interrupting device in accordance with the invention is connected to a variable power source, such as a portable generator, and the power source exhibits a lower frequency at start-up and requires a stabilization period before the optimal frequency, e.g., 60 Hz, is achieved.

If the frequency is not stable at the optimal frequency, or at least not within an acceptable range, initiation of the auto-monitoring routine is delayed until the frequency is stabilized. If the frequency does not achieve the optimal frequency, or a frequency within an acceptable range, within a predetermined time, a fail tally is incremented. Similar to the fail tally discussed previously with respect to the auto-monitoring routine, if the tally reaches a given threshold, microcontroller 301 declares EOL.

As described above, according to at least one exemplary embodiment, programmable device 301 is implemented in a microcontroller. Because some microcontrollers include non-volatile memory, e.g., for storing various data, etc., in the event of a power outage, according to a further embodiment, all events, timers, tallies and/or states within the non-volatile memory are cleared upon power-up of the device. Accordingly, if the fail tally or other condition resulted from, improper device installation, inadequate or improper power, or some other non-fatal condition with respect to the circuit interrupting device itself, the fail tally is reset on power-up, when the tally incrementing event may no longer be present. Another way of avoiding this potential issue in accordance with the invention is to utilize a programmable device that does not include non-volatile memory.

Thus, the invention provides, among other things, a GFCI receptacle having one or more line contact arms and one or more load contact arms. The line contact arms each having an upper phase and neutral line contact located on a bent portion of the line contact arm, and a lower phase and neutral line contact located on a substantially straight portion of the line contact arm. The load contact arms each having a phase and neutral load contact located on a bent portion of the load contact arm. Various features and advantages of the invention are set forth in the following claims.

What is claimed is:

1. A wiring device comprising:

a face terminal for electrically connecting to an external load;

a line terminal for electrically connecting to an external power supply;

a load terminal for electrically connecting to a second external load;

a face contact electrically connected to the face terminal;

one or more line contact arms electrically connected to the line terminal, each line contact arm having an upper line contact located on a bent portion of the line contact arm, and a lower line contact located on a substantially straight portion of the line contact arm; and one or more load contact arms electrically connected to the load terminal, each load contact arm having a load contact located on a bent portion of the load contact arm;

wherein, the face contact and the upper line contact are electrically connected, and the lower line contact and the load contact are electrically connected, when the wiring device in is a closed position, and the face contact and the upper line contact are electrically disconnected, and the lower line contact and the load contact are electrically disconnected when the wiring device is in an open position.

2. The wiring device of claim 1, wherein the face contact and the upper line contact are in a substantially flat connection when the wiring device is in the closed position.

3. The wiring device of claim 1, wherein the lower line contact and the load contact are in a substantially flat connection when the wiring device is in the closed position.

4. The wiring device of claim 1, wherein the bent portion of the line contact arm is bent at an angle of approximately three degrees to approximately six degrees relative to the substantially straight portion of the line contact arm.

5. The wiring device of claim 1, wherein the bent portion of the load contact arm is bent at an angle of approximately three degrees to approximately six degrees.

6. The wiring device of claim 1, further comprising a fault detection circuit that detects a fault condition in said wiring device and generates a fault detection signal when said fault condition is detected, wherein said fault detection signal electrically disconnects the face contact from the upper line contact and the lower line contact from the load contact.

7. A wiring device comprising:

a face contact;

one or more line contact arms having an upper line contact located on a bent portion of the line contact arm, and a lower line contact located on a substantially straight portion of the line contact arm;

one or more load contact arms having a load contact located on a bent portion of the load contact arm; and a fault detection circuit that detects a fault condition in said wiring device and generates a fault detection signal when said fault condition is detected, wherein said fault detection signal electrically disconnects the face contact from the upper line contact and the lower line contact from the load contact.

8. The wiring device of claim 7, further comprising a face terminal for electrically connecting to an external load, the face terminal electrically connected to the upper line contact;

a line terminal for electrically connecting to an external power supply, the line terminal electrically connected to the one or more line contact arms; and a load terminal for electrically connecting to a second external load, the load terminal electrically connected to the one or more load contact arms.

9. The wiring device of claim 7, wherein the face contact and the upper line contact are in a substantially flat connection when the wiring device is in the closed position.

10. The wiring device of claim 7, wherein the lower line contact and the load contact are in a substantially flat connection when the wiring device is in the closed position.

11. The wiring device of claim 7, wherein the bent portion of the line contact arm is bent at an angle of approximately three degrees to approximately six degrees relative to the substantially straight portion of the line contact arm.

12. The wiring device of claim 7, wherein the bent portion of the load contact arm is bent at an angle of approximately three degrees to approximately six degrees.

13. A method of operating a wiring device, the method comprising:

providing a face contact;

providing one or more line contact arms, each line contact arm having an upper line contact located on a bent portion of the line contact arm, and a lower line contact located on a substantially straight portion of the line contact arm;

providing one or more load contact arms, each load contact arm having a load contact located on a bent portion of the load contact arm;

electrically connecting the face contact and the upper line contact; and electrically connecting the lower line contact and the load contact.

14. The method of claim 13, wherein the face contact and the upper line contact are electrically connected in a substantially flat connection.

15. The method of claim 13, wherein the lower line contact and the load contact are electrically connected in a substantially flat connection.

16. The method of claim 13, wherein the bent portion of the line contact arm is bent at an angle of approximately three degrees to approximately six degrees relative to the substantially straight portion of the line contact arm.

17. The method of claim 13, wherein the bent portion of the load contact arm is bent at an angle of approximately three degrees to approximately six degrees.

18. The method of claim 13, further comprising detecting a fault condition; and electrically disconnecting the face contact from the upper line contact and the lower line contact from the load contact when the fault condition is detected.

* * * * *